United States Patent [19]

Gallo

[11] Patent Number: 4,529,068

[45] Date of Patent: Jul. 16, 1985

[54] INTEGRAL DISK BRAKE ACTUATOR AND ADJUSTER

[75] Inventor: Phillip C. Gallo, Akron, Ohio

[73] Assignee: Goodyear Aerospace Corporation, Akron, Ohio

[21] Appl. No.: 508,761

[22] Filed: Jun. 28, 1983

[51] Int. Cl.³ .............................................. F16D 65/54
[52] U.S. Cl. ................. 188/71.8; 188/196 P; 411/539
[58] Field of Search .............. 188/71.8, 196 P, 196 R, 188/374; 192/111 A; 411/531, 532, 533, 539

[56] References Cited

U.S. PATENT DOCUMENTS

| | | | |
|---|---|---|---|
| 3,887,047 | 6/1975 | Harnish et al. | 188/71.8 X |
| 3,957,146 | 5/1976 | Le Blanc | 192/111 A |
| 4,006,669 | 2/1977 | Price | 188/71.8 X |
| 4,180,147 | 12/1979 | Jarksen et al. | 188/71.8 |

Primary Examiner—Bruce H. Stoner, Jr.
Assistant Examiner—Michael P. Gilday
Attorney, Agent, or Firm—P. E. Milliken; L. A. Germain

[57] ABSTRACT

A brake wear adjuster is mounted within the bore of an actuator piston having a snap ring at the entrance of the bore. The adjuster includes a spring holder having a uniquely configured washer that is seated in a groove in the outer surface of the holder. A spring is carried about the holder between the washer and a flange at the opposite end of the holder. A pin having a mounted swage and a deformable swage tube are carried within the bore of the spring holder, the swage tube being movable with the holder while the pin and swage are stationary. Upon hydraulic fluid pressure being applied to the piston, the snap ring engages the washer and it in turn compresses the spring as it moves through the distance established in the groove. An occurrence of disk wear in the brakes causes the piston and holder to move further drawing the swage tube over the swage. Upon release of the pressure, the spring moves the washer and snap ring and thus also the piston to a retracted position to disengage the brake disks.

4 Claims, 5 Drawing Figures

INTEGRAL DISK BRAKE ACTUATOR AND ADJUSTER

BACKGROUND OF THE INVENTION

This invention generally relates to aircraft disk brakes and more particularly to a unique configuration for a disk brake actuator having an integrally mounted adjuster for brake wear compensation.

Aircraft disk brake assemblies are conventionally located within the inboard end of a wheel that is rotatably carried by a strut mounted axle. Various brake configurations are being used and these generally include a multi-disk stack of rotating and non-rotating friction elements, the rotating elements being keyed to the wheel while the non-rotating elements are keyed to a relatively stationary torque tube member. The torque tube is usually affixed to a brake housing that also carries a plurality of hydraulically driven actuators and brake wear compensating or adjusting devices. The actuators are in spaced locations about the brake housing and conventionally include a piston that engages a brake pressure plate associated with the disk brake stack to compress the stack and effect braking of the wheel in response to a requirement for braking action as effected by the pilot. The brake wear adjusters are in alternate positions with respect to the actuators and these generally include a pin-and-swage mechanism, the pin being connected to the brake pressure plate at one end and to the swage at the opposite end. The swage is drawn through a deformable tube as friction disk wear occurs and upon the application of braking effort and when the hydraulic pressure on the actuator is released, the adjusters draw the pressure plate away from the disk stack a specific distance. This maintains a constant distance of travel for the piston upon subsequent brake actuation irrespective of any wear experienced by the friction elements of the brake stack.

SUMMARY OF THE INVENTION

The present invention provides an improved configuration for a disk brake actuator wherein a brake wear adjuster is also integrally mounted within the actuator housing and cooperates directly with the piston action as the piston applies and releases compression on the disk brake stack of the brake assembly.

DETAILED DESCRIPTION OF THE INVENTION

Figure 1:
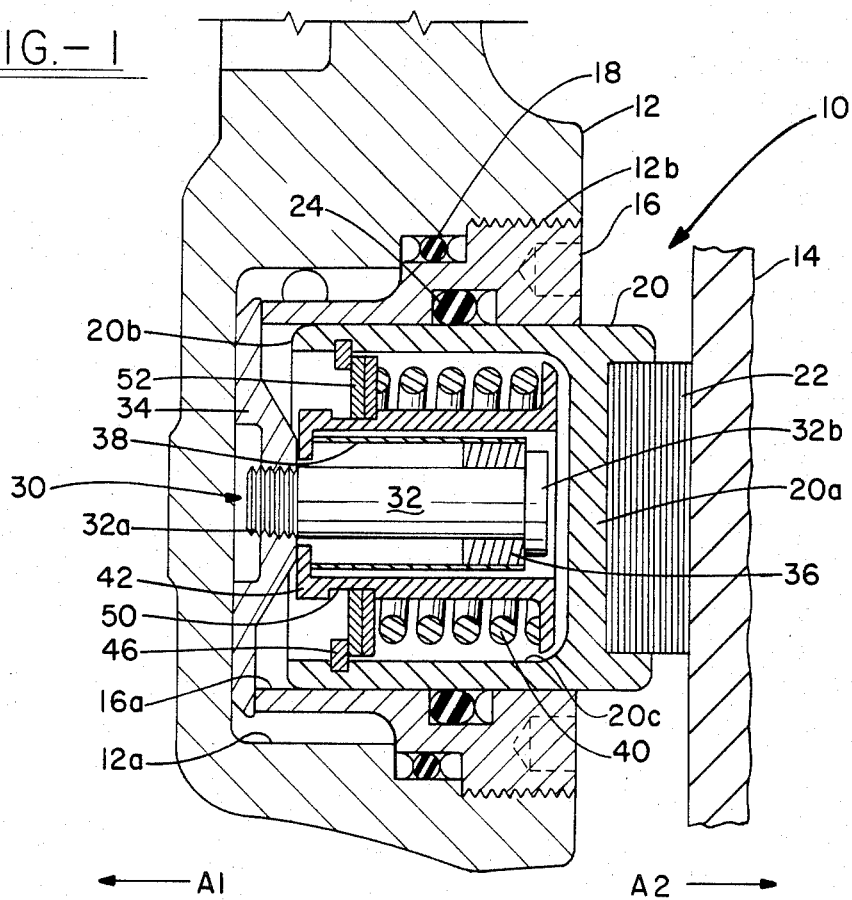
FIG. 1 is a sectional elevational view of an integrally mounted disk brake actuator/adjuster showing the arrangement of the elements forming the present invention.

Referring to FIG. 1 of the drawings, an actuator/adjuster apparatus according to this invention is generally indicated by reference numeral 10. The apparatus 10 is shown as it may be mounted to a brake housing 12 in a position to operate on a brake pressure plate 14 that is conventionally associated with a disk brake stack (not shown). Of course, the showing of FIG. 1 illustrates but a single actuator/adjuster, there being normally a plurality of these devices positioned about the brake housing. For the purposes of this description, directional arrows A1 and A2 indicate the inboard and outboard directions respectively of the aircraft wheel and brake assembly and these are usually taken with respect to a wheel strut mounting arrangement.

To continue, the apparatus 10 is mounted in a cavity or bore 12a provided in the housing 12 via a substantially cylindrical liner 16 that is threadably received within the cavity at 12b and sealed therein by an O-ring seal 18. The liner 16 also has a bore 16a that carries a piston 20 in sliding relationship therein, the piston also being of cylindrical shape and having an outboard closed end 20a which mounts a pad 22 for engagement with the brake pressure plate 14 in the usual manner. The inboard end 20b of the piston opens into a bore 20c that terminates at the closed end 20a to provide a pressure reservoir and surface for actuation of the piston. The piston 20 is, of course, sealed within the bore 16a of the liner 16 via an O-ring seal 24. It should now be understood that hydraulic fluid pressure within the cavity 12a effectively moves the piston 20 into engagement with the pressure plate 14 to thus compress a brake disk stack and provide the required braking action of a rotating wheel.

Now therefore, there is mounted within the bore 20c of the piston 20 a brake wear adjuster generally indicated by reference numeral 30. The adjuster 30 comprises a pin 32 having its inboard end 32a threadably received in a retainer 34. The retainer 34 is fixed in a stationary position within the cavity 12a by reason of the liner 16. The outboard end of the pin 32 has a head 32b that retains a swage element 36 on the pin so as to coact with a deformable swage tube 38 in a manner well known and understood in the art. Because various type swage elements 36 may be applied, the drawing is not specific to any one type but is rather fairly schematic to this element. In any case, the swage element 36 deforms the tube as the two are drawn relatively together, the swage entering into the bore of tube 38.

Figure 2:
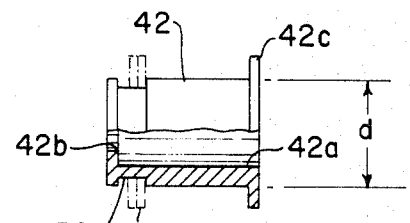
FIG. 2 is a full-sized elevational view, in partial section, of the adjuster spring holder forming an integral part of the invention.

The adjuster 30 further comprises a spring 40 that is carried on a spring holder 42. The spring holder 42 is more clearly illustrated in FIG. 2 of the drawings and it is a cylindrical body having a diameter "d" which defines a primary bore 42a. The bore 42a terminates inwardly at an end wall which defines a secondary bore 42b. As illustrated in FIG. 1, the pin 32 passes through the axially aligned bores 42a, 42b of the holder 42. The swage tube 38 is carried within the primary bore 42a and thus abuts the end wall of the spring holder at one end while engaging the swage element 36 at the opposite end. The spring holder 42 is further characterized by a radially extending flange 42c at its outboard end and by an annular groove 50 at its inboard end. The groove 50 carries a washer 52 therein as illustrated in FIG. 1 and also via ghost lines in FIG. 2. The washer 52 has a thickness somewhat less than the width of the groove 50 such that it may normally move within the groove. The spring 40 is carried on the holder 42 and somewhat compressed between the outboard flange 42c and the inboard mounted washer 52 and in this circumstance, it exerts a force on the washer in the inboard direction. The assembly of brake actuator and adjuster is completed by positioning a lock ring 46 within the piston bore 20c at the inboard end thereof, which lock ring interacts with the adjuster washer 52 in a manner for brake wear compensation as will be described hereinafter.

Figure 3:
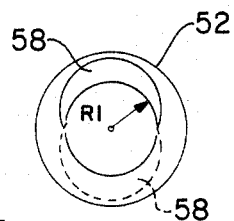
FIG. 3 is a full-sized plan view of the spring holder washers which mount on the spring holder of FIG. 2 in a unique manner.
Figure 4A:
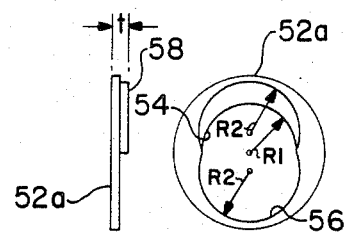
FIGS. 4A and 4B are end elevational and plan views of identical washers shown separately but with one rotated 180 degrees with respect to the other to illustrate the manner of cooperation between them when joined together to form a single washer as shown in FIG. 3.
Figure 4B:
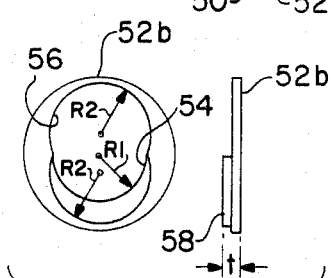

Turning now to FIGS. 3, 4A and 4B the washer 52 is more specifically illustrated. The washer 52 actually comprises two washers 52a and 52b which are identical in configuration. Each washer 52a, 52b has a bore comprised of two radial arcs 54 and 56, the radius of arc 54 being designated R1 and it is smaller than the arc 56 having a radius designated R2 by a specific amount. A circle of radius R1 which defines arc 54 describes the diameter of the groove 50 in the spring holder 42 while a circle of radius R2 which defines the arc 56 describes a circle having a diameter slightly greater than the diameter "d" of the spring holder 42. In this circumstance, a washer 52a or 52b may be easily slipped onto the spring holder 42 by way of the larger diameter bore portion 56 of radius R2. Now therefore, each washer 52a, 52b also has a double thickness portion indicated at 58 and this is defined by the inner arc of radius R1 and the outer arc of radius R2. Because both washers 52a and 52b are identical, it will now be appreciated that when the washer 52b is rotated 180 degrees with respect to washer 52a as shown in FIG. 4B, the double thickness portions will be aligned with the larger bores 56 of radius R2 and each will fit into the other in a locking arrangement. When this happens a single washer 52 will be formed having a thickness "t" and a single bore of radius R1 which will exactly fit the groove 50. Not only will the washer 52 fit into the groove 50, but it will be retained within the groove by the force exerted on it by the spring 40. In other words, the spring 40 will exert a force on the paired washers 52a, 52b such that they cannot be individually or otherwise rotated out of engagement with each other but will be captured in the groove 50 between the inboard end thereof and the spring 40.

From the foregoing description, it will be appreciated that the novel configuration of spring holder and washer makes for a very compact and simple brake wear compensation device.

In operation, an application of hydraulic fluid pressure within the brake housing cavity 12a moves the piston 20 in an outboard direction toward the pressure plate 14. As the piston 20 moves, the lock ring 46 engages washer 52 and causes it to move through the width of the groove 50 compressing the spring 40. FIG. 1 of the drawing illustrates this position which may apply sufficient pressure to the plate 14 to compress the brake disk stack. However, when the friction disks wear, the piston 20 continues to move and causes the spring holder 42 to also move and pull the swage tube 38 over the stationary swage element 36 until sufficient disk stack compression is applied for braking. At this point the outboard end i.e. the flanged end 42c of the spring holder abuts the closed end 20a of the piston and the spring 40 exerts an inboard directed force on the washer 52.

When the hydraulic pressure is released, the spring 40 pushes the washer 52 and the piston 20 in the inboard direction by reason of the lock ring 46 through the distance of the groove width to contact the opposite (inboard) end of the groove. The piston 20 is now withdrawn from the pressure plate 14 a sufficient distance and in a position for subsequent actuation of the brake by the pilot. Naturally, and it will be recognized by those skilled in the art, that the brake pedal travel experienced by the pilot relates directly to the actuator piston travel and this will always be the same since brake disk wear is compensated by the swage element. This distance is, of course, established in the groove 50.

What is claimed is:

1. In an aircraft disk brake system including a brake housing in spaced position from a disk brake pressure plate said housing and pressure plate being axially aligned at inboard and outboard positions respectively, said brake housing having a plurality of outboard facing cavities having axes in parallel alignment with the pressure plate axis and each said cavity being pressurized by hydraulic fluid pressure and carrying a hydraulic actuator which responds to a requirement for braking action and a brake adjuster to compensate for brake wear, said actuator and adjuster comprising in combination:

a cylindrical cavity liner having a bore and threadably received and pressure sealed within the brake housing cavity;

a piston slidably received and pressure sealed within the liner and having a cylindrical bore that is closed at the outboard end thereof for engagement with the disk brake pressure plate in response to hydraulic fluid pressure acting on the piston within its bore, said piston also having a snap ring mounted within its bore at the inboard end thereof;

a retainer member mounted within the cavity and held in stationary position at the inboard end of the cavity by the liner;

a pin axially positioned within the piston bore and having an inboard end affixed to the retainer and an outboard end having a swage element mounted thereon;

a cylindrically shaped spring holder axially positioned within the piston bore and defining an ouboard facing primary bore that terminates in a wall at the inboard end of the holder, said wall having an axially aligned secondary bore through which the pin is slidably received, said holder also having a radially extending flange at its outboard end and an annular groove of a specific width within its surface at the inboard end;

a washer mounted in the groove of said holder and having a thickness less than the width of the groove and a radial extent so as to interact with the snap ring that is mounted within the piston bore when the piston moves;

a spring mounted about said holder between the outboard radially extending flange and the washer; and a deformable swage tube mounted about the pin within the primary bore of the spring holder, said swage tube abutting the wall at the inboard end and engaging the swage element at the outboard end;

said piston being moved via hydraulic fluid pressure in an outboard direction to engage the pressure plate whereupon the snap ring engages the washer and moves it through the width of the groove to compress the spring and upon the existence of brake wear said washer moves the spring holder and thus also the swage tube in the outboard direction over the swage element and upon release of the hydraulic pressure said spring moves the washer and the piston in the inboard direction by the inter-engagement of the washer and snap ring to disengage the piston from the pressure plate by a distance as established in the groove.

2. The combination as set forth in claim 1 wherein the washer comprises a pair of interlocking washers that are easily mounted within the groove of the spring holder but are maintained within the groove by reason of their interlocking arrangement.

3. The combination as set forth in claim 2 wherein the washers are identical, each said washer having a bore defined by a first circular arc portion and a second larger circular arc portion, the first arc portion defined by a radius R1 while the second arc portion is defined by a radius R2 the second circular arc portion being sufficiently large to enable mounting of the washer onto the spring holder while the first circular arc portion describes the diameter of the groove within the holder, said identical washers being mounted in the groove and locked together such that only the first circular arc decribes a bore through the interlocked washers.

4. The combination as set forth in claim 3 wherein the washers are locked together via a thickness extension defined by the circular arcs of radius R1 and R2 respectively wherein a 180 degree rotation of one of the washers seats the extensions within the bore portion having a radius R2.

* * * * *